June 12, 1956  C. A. BLAIR  2,749,766
REVERSE GEARING

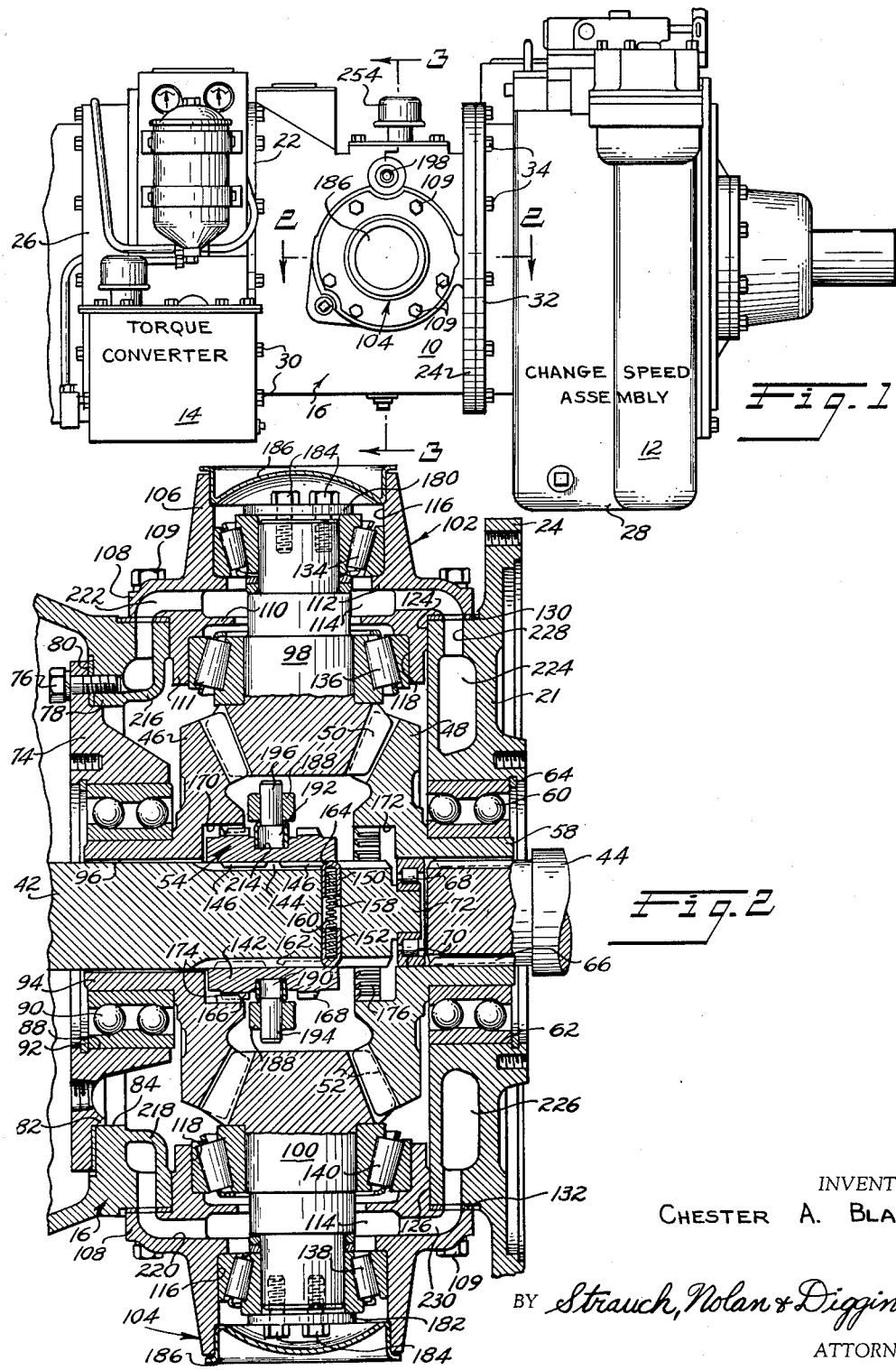

Filed July 25, 1951 2 Sheets-Sheet 2

INVENTOR
CHESTER A. BLAIR
BY Strauch, Nolan & Diggins
ATTORNEYS

United States Patent Office 2,749,766
Patented June 12, 1956

2,749,766

REVERSE GEARING

Chester A. Blair, Oshkosh, Wis., assignor, by mesne assignments, to Rockwell Spring and Axle Company, Coraopolis, Pa., a corporation of Pennsylvania Application July 25, 1951, Serial No. 238,450

1 Claim. (Cl. 74—379)

This invention relates to power transmission gearing arrangements and more particularly to torque reversing mechanism for vehicles adapted for interposition in a vehicle drive train intermediate a power source and a change speed mechanism such as between the output of a hydraulic torque converter and a change speed gearing mechanism.

In certain types of vehicles which are designed for particular duties, such as strip mining operations, it has been found necessary to provide a vehicle drive train of such construction and arrangement that the vehicle may be driven by a prime mover at a like plurality of speeds in a reverse as well as a forward direction.

It is, therefore, a major object of this invention to provide torque reversing mechanism of novel construction and adapted to be operatively interposed in a vehicle drive train intermediate a source of power and a change speed mechanism so that the driving torque available from the power source may be transmitted at all speeds to the drive wheels in either forward or a reverse direction.

A further object of my invention is to provide a vehicle drive train including a novel reverse gear mechanism interposed between a power source and a change speed mechanism that permits the changing of the drive direction without modifying the transmission gear ratio of the change speed mechanism.

Another important object of my invention is the provision of a novel torque reversing mechanism that is compact in construction and which is adapted to be interposed between coaxially aligned power input and output shafts.

A further requirement of such special duty vehicles is that one or more power take off shafts be provided which are driven at substantially constant speeds independent of the driving speed of the vehicle but which are reversed in their direction of drive simultaneously with a reversal of the direction of the vehicle drive.

It is, therefore, a further important object of my invention to provide a reversible drive mechanism in a vehicle drive train for interconnecting coaxially aligned prime mover driven and main vehicle drive shafts which is adapted to provide a power take-off normal to the axis of the mechanism on either or both sides thereof, the rotation of which are reversed simultaneously with the reversal of the main vehicle drive shafts.

In prior art reversible drive mechanisms, it has been customary to provide drive trains, the gears of which are all journalled for rotation about spaced fixed parallel axes. Such drive trains require much space even where the input and output shafts need not be coaxially aligned. When it is necessary for the input and output shafts of such mechanisms to be coaxially aligned, the drive trains of the prior art become extensive and require much space and include many bearings. High costs of manufacture and unnecessary bulk result from such drive arrangement.

In certain forms of vehicle drive trains, torque is applied constantly to the elements of a drive train so that reversal of the applied torque must be effected while the torque is actually applied to the drive train element. A drive train including a prime mover driven torque converter is one form of such drive train. In such a drive train, I have found that it is an important consideration that a torque reversing mechanism for the drive train be interposed in the drive train at the point of minimum substantially constant torque so that the torque reversal may be effected with a minimum strain on the parts of the reversing mechanism and with minimum effort necessary to effect the shift of the mechanism.

A further object of my invention is, therefore, to provide a novel arrangement for a vehicle drive train to which driving torque is constantly applied from a prime mover by which reversal of the applied torque may be effected while torque is applied with minimum strain upon the elements of the reversing mechanism and with a minimum amount of effort necessary to effect the reversal of the drive.

A still further important object of my invention is, therefore, to provide, in a vehicle drive train, a torque reversing mechanism of such construction that it may be interposed between the output shaft of a torque converter and the input shaft of a change speed mechanism so that the torque reversing mechanism is located in the drive train at a point where the torque transmitted is at a minimum and substantially constant value.

I am, of course, aware that certain forms of differential type bevel gear torque reversing devices have been suggested for various purposes in the past. For example, such a mechanism has been suggested for effecting the reversal of torque application to a driven shaft from a driving shaft journalled for rotation about an axis intersecting that of the drive shaft at right angles and terminating adjacent the driven shaft. In such a mechanism a bevel gear is fixed to the driving shaft, a pair of bevel pinions are journalled for rotation upon the driven shaft in constant mesh with the bevel gear, and a clutch is provided for alternatively rigidly coupling the driven shaft to one or the other of the pinions. In such a mechanism, the direction of torque application to the driven shaft is dependent upon the one of the bevel pinions to which it is clutched. None of these prior mechanisms has been suggested in the special combination of a torque converter and speed change gearing.

I have provided a novel torque reversing mechanism which may be considered to be of this general type but which is of a novel arrangement by which it may be utilized, not merely to reversibly interconnect coaxially aligned driving and driven shafts, but also to provide auxiliary shafts suitable for power take-off connections.

The foregoing and other objects of my invention will become apparent by reference to the appended claim and to the following detailed description which proceeds in reference to the accompanying drawings wherein:

Figure 1 is a side elevation of a portion of a vehicle drive train embodying the present invention;

Figure 2 is an enlarged sectional view of the torque reversing mechanism of my invention taken along the line 2—2 of Figure 1;

Figure 3:
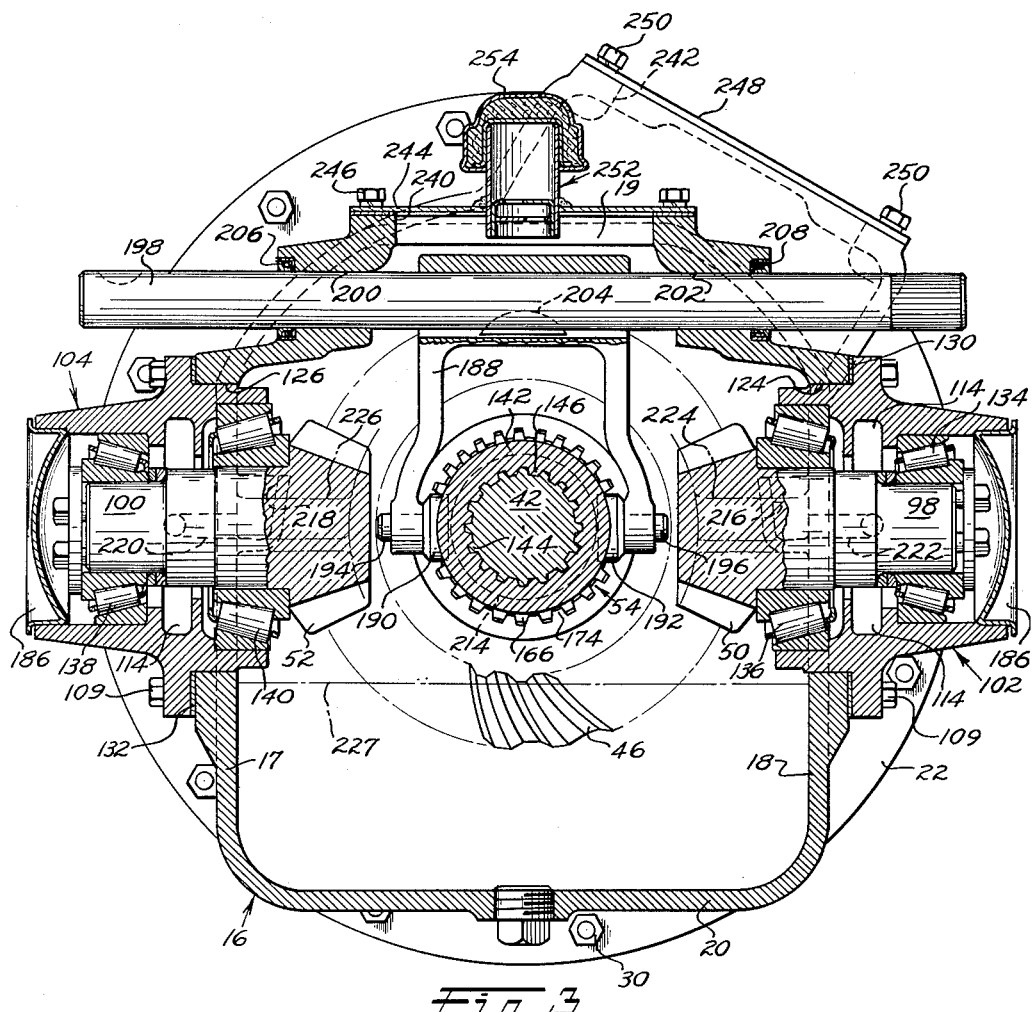
Figure 3 is a vertical sectional view of the torque reversing mechanism taken along the line 3—3 of Figure 1.

Referring now to the drawings and in particular to Figure 1, the numeral 10 generally indicates the drive torque reversing mechanism of the present invention, and the numerals 12 and 14 indicate respectively a change speed mechanism assembly, which may be of any conventional type such as a change speed gearing mechanism, and a prime mover driven hydraulic torque converter assembly.

The change speed mechanism 12 may be any conventional selective gear shift assembly. The torque converter 14 is preferably of conventional design and may be that disclosed in United States Letters Patent No. 2,400,093 to which reference may be made for any further detail necessary to understand the present invention.

The torque reversing mechanism assembly 10 includes a housing 16 having spaced side walls 17 and 18 integrally interconnected by top and bottom walls 19 and 20 and a rear end wall 21. Housing 16 is provided at its opposite ends with annular external flanges 22 and 24 to facilitate its mounting relative to the housings of torque converter 14 and change speed mechanism 12.

The torque converter mechanism assembly 14 is provided with a housing indicated generally at 26 while the change speed mechanism assembly 12 is provided with a housing indicated generally as 28. Flange 22 of housing 16 abuts the rear face of housing 26, and housings 16 and 26 are secured together in rigid assembly as by a plurality of machine screws 30 passing through apertures in flange 22 and threadedly engaged with aligned tapped holes in housing 26. Housing 28 is provided with an external annular flange 32 mating with the rear flange 24 of housing 16. Housings 16 and 28 are secured together in rigid assembly as by a plurality of machine screws 34 passing through flange 32 and threadedly engaged with aligned tapped holes in flange 24.

The torque reversing mechanism which is illustrated in detail in Figures 2 and 3, is adapted alternatively either to apply full driving torque directly from a driving shaft 42 to a driven shaft 44 coaxially aligned therewith, or to apply torque from shaft 42 to shaft 44 in a reverse direction. In the disclosed embodiment of my invention, driving shaft 42 is the output shaft of the prime mover driven torque converter assembly 14. Torque is constantly applied to shaft 42 in the same direction of rotation. Driven shaft 44 is the input shaft for the change speed mechanism assembly 12, and may be driven in either direction in the invention.

The torque reversing mechanism comprises a pair of coaxially aligned bevel gears 46 and 48 of the same size and a pair of bevel pinions 50 and 52 constantly meshed with gears 46 and 48 and journalled for free rotation about a common axis intersecting that of bevel gears 46 and 48 midway between gears 46 and 48. A clutch mechanism 54 is operable to either directly couple shafts 42 and 44 for rotation together in the same direction, or to drivingly couple them through the intermediary of the bevel gearing for rotation of shaft 44 in the opposite direction from shaft 42.

Bevel gear 48 is rotatably mounted coaxially with shaft 44 and centrally on the rear wall 21 of housing 16, being provided with an elongated hub 58 extending within the inner race of an anti-friction bearing 60 mounted within a bore 62 in rear wall 21. A retainer snap ring 64 is provided within bore 62 to prevent rearward axial movement of bearing 60.

Driven shaft 44 is splined to gear 48 for rotation therewith as indicated at 66. Shaft 44 is thus mounted for rotation about the longitudinal axis of the torque reversing mechanism housing 16 by bearing 60, further anti-friction bearing means (not shown) are provided to support it within housing 28 of the change speed mechanism assembly 12.

An anti-friction pilot bearing 68 is mounted within the bore 70 of gear hub 58 forwardly of the end of shaft 44 and supports the reduced end portion 72 of the driving shaft 42. Shaft 42 is thus mounted for rotation in coaxial alignment with driven shaft 44 by bearing 68 and by further anti-friction bearing means (not shown) within the housing 26 of the torque converter assembly 14.

Bevel gear 46 is mounted on a carrier 74, which serves as a front end wall for housing 16 and is rigidly secured by machine screws 76 to an integral internal flange 78 of housing 16, a liquid tight gasket 80 being interposed between carrier 74 and flange 78. Carrier 74 is formed with a shoulder 82 piloted by a mating surface 84 within flange 78 to maintain proper transverse alignment between carrier 74 and housing 16. A bore 88 is formed centrally through the carrier 74, and an anti-friction bearing 90 is mounted therein, forward axial movement of bearing 90 being prevented by a retainer snap ring 92. Gear 46 is provided with an elongated hub 94 upon which is pressed the inner race of bearing 90 so that gear 46 is journalled for rotation about the common axis of shafts 42 and 44. Hub 94 of gear 46 has a coaxial bore 96 through which shaft 42 extends free of contact.

Bevel pinions 50 and 52 are formed integral with or otherwise fixed for rotation with auxiliary shafts 98 and 100 respectively, and are supported on housing 16 in coaxial alignment with each other by carriers 102 and 104, respectively. The axes of shafts 42, 44, 98 and 100 all lie in a common horizontal plane in the illustrated embodiment of the invention.

Since carriers 102 and 104 are identical, it will suffice to describe the structure of but one in detail. Carrier 102 is annular and comprises a bearing support portion 106 and a radial flange portion 108 externally of housing 16. Flange 108 is fixed to housing 16 as by screws 109. Within housing 16 carrier 102 is formed with an internal radial baffle 110 and a bearing support portion 111. Baffle 110 coacts with a similar baffle 112 located inwardly of flange 108 to define an annular lubricant receiving well 114. At opposite ends carrier 102 has aligned bearing support recesses 116 and 118.

A pair of coaxially aligned bores 124 and 126 are formed through the side walls 18 and 17 respectively of the torque reversing mechanism housing 16, as illustrated in Figures 2 and 3. Cylindrical intermediate portions of carriers 102 and 104 extend through bores 124 and 126 respectively in piloting engagement therewith, and carriers 102 and 104 are secured in position rigidly with housing 16 as by machine screws 109. Annular gaskets 130 and 132 are interposed between the adjacent surfaces of the carrier flange portion 108 and the side walls respectively to prevent leakage of lubricant from housing 16.

Pinion shafts 98 and 100 are journalled for rotation about a common axis normal to and intersecting the common axis of shafts 42 and 44 at a point substantially midway between gears 46 and 48. A pair of oppositely directed tapered roller bearings are mounted within each of the carriers 102 and 104 for this purpose, shaft 98 being journalled by bearings 134 and 136 mounted respectively within bores 115 and 116 of carrier 102, and shaft 100 being journalled by bearings 138 and 140 mounted respectively within bores 116 and 118 of carrier 104.

As previously indicated, clutch 54 is alternatively operative to directly couple shafts 42 and 44 together for rotation in the same direction or to establish a drive from shaft 42 to shaft 44 through the bevel gearing to impart a reverse rotation to driven shaft 44.

Clutch 54 comprises a clutch collar 142 mounted for rotation with and limited axial sliding movement along driving shaft 42 intermediate gears 46 and 48. External longitudinally extending spline teeth 144 are formed on shaft 42 to mate with complementary internal spline teeth 146 formed within the bore of clutch collar 142.

The axial position of clutch collar 142 relative to shaft 42 is resiliently maintained by a double ended detent 42 formed by a pair of hollow members 150 and 152 having hemispherical end surfaces and which are slidably mounted within a diametrically extending bore 158 formed through shaft 42 in alignment with a diametrically opposed pair of spline teeth 146. A compression spring 160 is mounted within bore 158 intermediate members 150 and 152 to bias these members outwardly from the center of shaft 42. The diametrically opposed pair of spline teeth 146 are each formed with a transverse detent engaging notch 162 substantially midway between their ends and a further detent engaging notch 164 at their ends adjacent gear 48. In Figure 2 the collar is shown as held in mesh with gear 46 by the engagement of the detents in notches 164.

Clutch collar 142 is formed adjacent its ends with two annular rows of external teeth 166 and 168. The faces of gears 46 and 48 adjacent collar 142 are formed respectively with recesses 170 and 172 having therein annular rows of internal teeth 174 and 176 respectively. Clutch teeth 174 and 176 are of such size, shape and spacing as to mesh with the annular rows of external clutch teeth 166 and 168 on the clutch collar 142. In the illustrated position of clutch collar 142, gear 46 is coupled for rotation with drive shaft 42 so that shaft 44 is reversely driven from shaft 42 through gear 46, pinions 50 and 52, and gear 48. The detents engaged in notches 164 hold collar 142 against accidental movement. When clutch collar 142 is shifted to the right in Figure 2 until detents 150 and 152 engage notches 162, clutch teeth 168 mesh with clutch teeth 176 to directly couple gear 48 and shaft 44 to the driving shaft 42 for rotation therewith in the same direction. Under such conditions gear 46 idles reversely.

Figure 4:
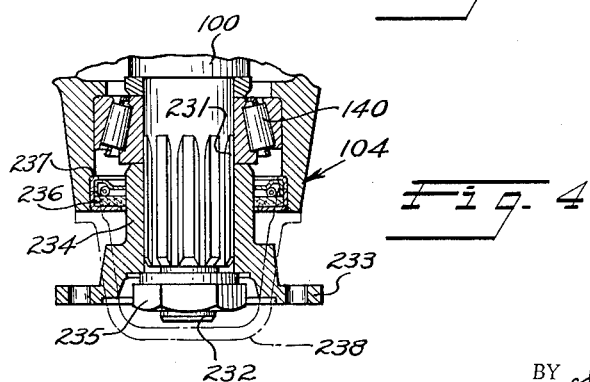
Figure 4 is a fragmentary view showing a modified shaft end.

It will be noted that upon reversal of the drive to shaft 44, the direction of rotation of shafts 98 and 100 is simultaneously reversed. As illustrated in Figure 2, flat plates 180 and 182 are secured to the ends of shafts 98 and 100 respectively by machine screws 184, and a bearing cap 186 is pressed into the ends of bores 114 of the carriers 102 and 104 to prevent the entrance of dirt into the housing 16. By removal of caps 186 and plates 180 and 182, and the attachment of suitable couplings to shafts 98 and 100, either or both of these auxiliary shafts may be readily adapted for power take-off purposes. An optical shaft structure for power take-off purposes is shown in Figure 4 and will be described. The previously mentioned simultaneous reversal of power take-off drive and main vehicle drive will be effected automatically.

The mechanism for axially shifting clutch collar 142 along shaft 42 is shown best in Figure 3. It comprises a shift yoke 188 having a pair of trunnions 190 and 192 mounted internally of the ends of its arms for rotation upon stub-shafts 194 and 196, respectively. Yoke 188 is supported within the housing 16 upon a horizontal shaft 198 rockably mounted in aligned bores 200 and 202 in the side walls 17 and 18, respectively, adjacent the top thereof. Yoke 188 is fixed for movement with shaft 198 by any suitable means such as by key 204. Oil seals 206 and 208 of conventional design are mounted about shaft 198 in the outer ends of bores 200 and 202 respectively. As is best shown in Figure 2, the trunnions 190 and 192 engage a continuous annular groove 214 on clutch collar 142 intermediate the annular rows of clutch teeth. By this connection, pivotal movement of shaft 198 about its axis, which may be effected by any conventional linkage (not shown), will produce axial movement of the clutch collar 142 relative to the shaft 42.

Provision is made for the efficient lubrication of bearings 134, 136, 138 and 140. The special structure for lubricating these bearings is best shown in Figure 2. Small integral open top oil pockets 216 and 218 are formed within the forward corners of housing 16 immediately to the rear of carrier attachment flange 78. The vertical position within housing 16 and the level of the top of the pockets 216 and 218 may best be seen by reference to Figure 3 wherein the bottoms of the pockets are located slightly below the center lines of shafts 98 and 100. A lubricant channel 220 leads from the bottom of pocket 218 through wall 17 of housing 16, through the gasket 132, and through the flange portion 108 of carrier 104 to permit the flow of lubricant from pocket 218 into the lubricant well 114 of carrier 104. A similar lubricant channel 222 leads from the bottom of pocket 216 through the wall 18 of housing 16 through the gasket 130, and the flange portion 108 of carrier 102 to permit the flow of lubricant from pocket 216 to the well 114 of carrier 102.

A pair of larger open top oil pockets 224 and 226 are formed in the corners of the rear wall 21 of the housing 16. The vertical position within housing 16 and the level of the top edges of these pockets is likewise best seen by reference to Figure 3. As is shown in Figure 2, a lubricant channel 228 leads from the bottom of pocket 224 through the wall 18 of housing 16, through the gasket 130 and through flange portion 108 of carrier 102 to permit the flow of lubricant from pocket 224 into the annular lubricant well 114 of carrier 102. Likewise an oil channel 230 leads from the bottom of pocket 226 through wall 17, gasket 132, and flange 108 of gear 104 to permit the flow of lubricant from pocket 226 to the annular lubricant well 114 of carrier 104. During operation, the lubricant level, as indicated by line 227, is maintained in housing 16 to immerse the lower ends of gears 46 and 48 and oil splashed up on the housing walls by the gears is collected in the pockets and flows by gravity into wells 114 from whence it flows through the bearings of shafts 98 and 100 and back down into casing 16.

As is best shown in Figure 3, a pair of openings 240 and 242 are provided in the walls of housing 16 to facilitate access to the several parts mounted therein. Opening 240 has a cover 244 removably secured to the housing 16 as by machine screws 246. A cover 248 removably secured to the housing 16 by machine screws 250 is provided for opening 242. A vent tube 252 having a cap 254 extends centrally through cover 244 and is secured thereto as by welding.

Figure 4 shows an alternative construction which may be used when the shafts 98 and 100 are employed for power take-off purposes, shaft 100 only being illustrated to explain the modification.

Here shaft 100, beyond bearing 140, is formed with an axially splined section 231 and terminates in a reduced end section 232. A suitable coupling 233 having a hub 234 splined on section 231 may be mounted on the shaft. When nut 235 is drawn tight hub 234 is drawn into tight abutment with the inner race of bearing 140. An annular lubricant seal 236 is mounted on shoulder 237 between hub 234 and the carrier 104.

Should no power take-off coupling be desired, a suitable cap 238 is secured to carrier 104 over the free end of the shaft, as shown in phantom lines in Figure 4.

Having now described an exemplary embodiment of my novel torque reversing mechanism in detail it is obvious that by my improved construction a compact, simple, and efficient torque reversing mechanism has been provided which is suitable for reversibly drivingly interconnecting coaxially aligned driving and driven shafts and which includes auxiliary driven shafts which may be readily adapted for power take-off purposes and the direction of rotation of which will be simultaneously and automatically reversed with the reversal of the direction of rotation of the main driven shaft. By locating the clutch and clutch teeth to coact with the relatively lower speed gears 46 and 48 in the assembly, there is reduced tendency to damage the clutch during shifting in service.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A unitary assembly providing selectively actuate torque reversing mechanism for operative interposition between a torque converter and a variable speed transmission, said assembly comprising a housing having spaced front and rear mounting flanges adapted for attachment respectively to a torque converter and a variable speed transmission housing, said torque reversing mechanism housing having aligned front and rear openings and aligned side openings, anti-friction bearings in said front and rear openings, coaxial bevel gears of the same size journalled in said housing by the anti-friction bearings in said front and rear openings, a pair of coaxial bevel pinions each meshed with both of said bevel gears and each having a shaft, anti-friction bearings in the side openings journalling said pinion shafts, bearing cages mounting said pinion shaft anti-friction bearings on said housing in the said side openings upon a common axis normal to the axis of said bevel gears, coaxial drive and driven shafts extending through bevel gears, means non-rotatably mounting one of said bevel gears on the one of said coaxial shafts that extends therethrough, the other of said bevel gears having an axial bore freely surrounding the other of said coaxial shafts, a clutch collar non-rotatably and slidably mounted on said other shaft in the space between said bevel gears, coacting clutch teeth on opposite sides of said collar and the adjacent sides of said bevel gears so that the collar may be shifted into toothed engagement with either of said bevel gears, a selectively actuate shifting fork mounted on said housing and operatively connected to said clutch collar to effect axial movement thereof, the axes of said shafts all lying substantially in a horizontal plane, open top pockets in the walls of said housing located at least as high as the level of the pinion shaft axes for receiving lubricant thrown up from the bottom of said housing by said bevel gears, and passages through said housing and said bearing cages extending between said pockets and said pinion shafts bearings for conducting lubricant to the latter.

References Cited in the file of this patent
UNITED STATES PATENTS

| | | |
|---|---|---|
| 801,501 | Baker | Oct. 10, 1905 |
| 1,363,044 | Johnson | Dec. 21, 1920 |
| 1,480,933 | Elconin | Jan. 15, 1924 |
| 2,049,126 | Maybach | July 28, 1936 |
| 2,049,127 | Maybach | July 28, 1936 |
| 2,274,836 | Koster | Mar. 3, 1942 |
| 2,561,104 | Fawick | July 17, 1951 |

FOREIGN PATENTS

| | | |
|---|---|---|
| 461,947 | Great Britain | Feb. 26, 1937 |